May 20, 1958
C. H. JORGENSEN
2,835,540
GUIDE BEARING
Filed March 14, 1957
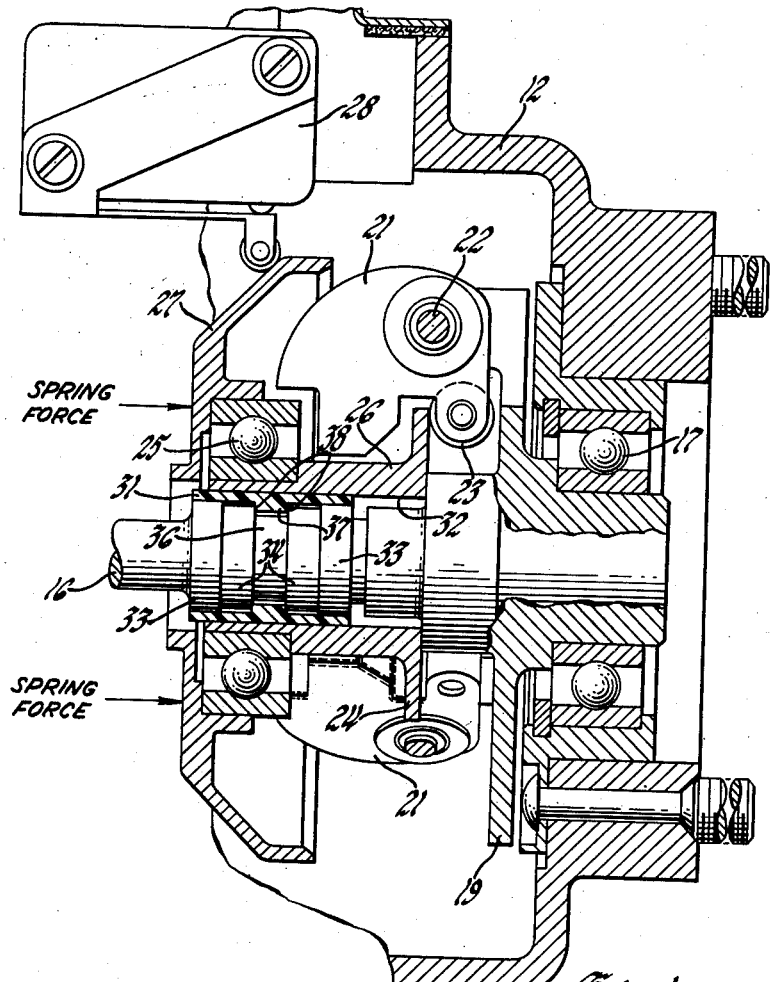
INVENTOR.
Clarence H. Jorgensen
BY
Paul Fitzpatrick
ATTORNEY

United States Patent Office 2,835,540
Patented May 20, 1958

2,835,540

GUIDE BEARING

Clarence H. Jorgensen, Milwaukee, Wis., assignor to General Motors Corporation, Detroit, Mich., a corporation of Delaware Application March 14, 1957, Serial No. 645,993

5 Claims. (Cl. 308—4)

My invention relates to guide bearings and particularly to those employing a synthetic organic polymeric material as one element and having improved arrangements for supporting and locating this element.

The advantageous properties of suitable synthetic organic polymeric materials such as nylon and Teflon for use as bearings have been recognized. Such materials have a high lubricity or, in other words, low coefficients of friction in contact with metal surfaces, and thus require no lubrication. They do not tend to score and have sufficient load carrying capacity for some applications. In applications where relatively close bearing clearances are required, and where operation under a considerable range of temperatures is necessary, the high coefficient of thermal expansion of such materials has been a detriment to their use. If a bearing has suitably close clearances at low temperatures, the expansion of nylon or other material may cause binding at higher temperatures encountered during operation.

This invention is directed principally to an improved structure which provides adequate retention of the nylon or other plastic material (which will be referred to hereafter simply as "nylon" in the interest of conciseness) while permitting the use of a quite thin nylon sleeve so that the total thermal expansion thereof is much less than with the usual relatively thick bearing sleeves.

The improved bearing is particularly suited for use as a sliding guide bearing in a speed responsive switch and is so described herein, but, as will be apparent, it is capable of various applications.

To indicate the general nature of the invention, in its preferred embodiment it employs a nylon bearing sleeve which is disposed between two reciprocable members. The end portions of the sleeve which serve as a guide bearing are thin. A ridge or rib on the sleeve engages in a groove in one of the members to locate the sleeve axially of the member. The rib on the nylon sleeve is spaced radialy from the bottom of the groove so that the thick section at the rib may expand freely.

The nature of the invention and the advantages thereof will be more clearly apparent to those skilled in the art from the succeeding detailed description of the preferred embodiment of the invention and the accompanying drawings.

Figure 1 is a partial sectional view of a speed responsive switch mechanism incorporating the invention.

Figure 2 is an axonometric view of the bearing sleeve.

Referring first to Figure 1, there is disclosed a portion of a speed switch device sufficient for an understanding of the present invention.

The speed switch device is fully disclosed in the application of Clarence H. Jorgensen and Willard T. Nickel, Serial No. 626,861, filed December 7, 1956, of common ownership with this application.

The speed switch device comprises a case or housing 12 within which is mounted the main shaft or speed shaft 16 driven by the machine to the speed of which the device responds. Speed shaft 16 is rotatably mounted in a ball bearing 17 in the case and another bearing (not shown). A flange 19 on the shaft is provided with means for mounting three flyweights 21 which tend to move outwardly under the action of centrifugal force when the shaft is rotated. The flyweights are mounted on shafts 22 and mount rollers 23 which bear against the flange 24 of a thrust collar 26 slidably mounted on shaft 16. A non-rotating switch actuator 27 is rotatably coupled to the thrust collar 26 by a ball bearing 25. Suitable springs (not illustrated, but indicated by the legends "spring force" on the drawing) urge the switch actuator to the right in the figure. The switch actuator 27, when moved to the left by the flyweights against the spring force, operates one or more switches 28 of a known sensitive snap action type. This movement is accompanied by reciprocation of the thrust collar 26 on the shaft 16.

For precise operation of the switch at the desired speed points, it is important that sliding friction between the thrust collar and shaft be minimized. Lubrication is impracticable, and space limitations preclude satisfactory installation of linear ball bearings or the like. Since the thrust collar 26 is depended upon for alignment of the switch actuator 27, it must be accurately guided by shaft 16.

These requirements are satisfied by the arrangement of the guide bearing including the nylon sleeve 31 which has an outer cylindrical surface bearing against inner cylindrical surface 32 of the switch actuator 26. Surface 32 is a bearing surface on the element 26 which is slidable on the outer surface of sleeve 31. Shaft 16 provides the inner element of the structure which supports the sleeve 31. Shaft 16 includes two portions 33 which bear radially against the inner surface of the end portions of sleeve 31. Adjacent the points 33 are two portions 34 of slightly reduced diameter which are radially spaced from the inner surface of sleeve 31. Between the portions 34 is a groove 36 in the shaft which receives a rib 37 on sleeve 31 with radial clearance between the bottom of the groove and the cylindrical surface of the rib. The side surfaces 38 of the rib lie between the radial side surfaces of groove 36, this engagement locating the sleeve on the shaft and holding it against movement axially of the shaft.

Only the end portions of sleeve 31 which are supported radially by the portions 33 of the shaft provide the bearing surfaces. These surfaces are well spaced along the shaft to prevent any cocking of the thrust collar. There is no great radial load on the bearing. If the load were greater, the clearances at 34 could be omitted to provide a larger effective bearing surface.

Because the sleeve is located by the relatively thick rib 37, the remainder of the sleeve may be quite thin in the radial dimension so that its greater thermal expansion than that of the shaft and thrust collar does not require a harmful amount of clearance in the cold condition of the speed switch to allow sufficient clearance when the switch is heated when running by heat conducted or radiated from the engine on which it is mounted. If the bearing portions at the end of the sleeve were lodged against abutments as is common practice, the sleeve would need to be much thicker to provide certain retention of the sleeve against dislodgment in the axial direction.

By way of illustration, in an actual speed switch structure, the sleeve 31 is 5/8 inch long and 1/2 inch in outside diameter. The end portions of the sleeve are only 1/32 inch thick. The rib 37 extends about 1/25 inch inwardly from the sleeve. The portions 34 of the shaft provide about 1/100 inch radial clearance from the sleeve and the portion 36 a slightly greater clearance. The clearance between the outer surface of sleeve 31 and the inner surface of thrust collar 26 is four to six thousandths inch on the diameter, at room temperature. With this small clearance, the collar slides freely at temperatures up to 300 degrees F., notwithstanding the fact that the thermal expansion of the nylon sleeve is about ten times that of the steel shaft and collar. Also, the clearance is not too great at 67 degrees below zero Fahrenheit, a temperature at which the switch must be capable of operating. This results from the thin nylon section (about 1/32 inch) made possible by the invention. It will be understood that the specific dimensions recited relate to one embodiment and are subject to variation to suit other installations.

To provide for mounting the sleeve 31 on the shaft, it is provided with a helical cut 41 so that it may be opened up and slid over the supporting surfaces on the shaft.

Because of the inherent low friction of the nylon sleeve against the thrust collar, no lubrication is required and frictional resistance to movement of the thrust collar is very slight and consistent. The end result is highly accurate response of the speed switch to the speed of shaft 16.

The preferred material for sleeve 31 is nylon, which is a generic term for a series of polyamide resins made by the polymerization of a hexamethylenediamine salt of adipic acid. The sleeve may also be composed of a polymerized tetrafluroethylene, known commercially as "teflon."

The invention is not primarily concerned with the selection of a suitable material, but rather with the improved physical arrangement which facilitates the use of more or less plastic materials falling within the general class of synthetic organic polymeric materials which are suitable for the purpose because of their load carrying capacity, resistance to scoring, and low coefficients of friction.

It will be seen from the foregoing that the invention is particularly suitable for the speed switch installation described, but may be advantageously employed in various installations where guide bearings are required. It will be apparent that the structure could readily be reversed to provide a sliding bearing between the sleeve and the shaft 16 and provide the supporting surface, the clearance surface and the locating groove in the outer member 26.

The detailed description of the preferred embodiment of the invention for purpose of explaining the principles thereof is not to be construed as limiting the invention, as various modifications may be made by exercise of skill in the art within the scope of the invention.

I claim:

1. A guide bearing arrangement comprising, in combination, a first element defining a bearing surface, a second element defining a supporting surface, the elements being relatively reciprocable, the said surfaces being opposed and mutually spaced, and an intermediate member of a synthetic organic polymeric material having inner and outer faces, one of said faces being in sliding engagement with the said bearing surface, the other of said sleeve faces being in supporting engagement with the said supporting surface adjacent the ends of the member, the supporting surface having a groove therein and the member having a rib thereon received in the groove and spaced from the bottom of the groove, the rib and groove extending transversely to the direction of relative reciprocation of the elements to retain the member against movement relative to the supporting element.

2. A guide bearing arrangement comprising, in combination, a first element defining a bearing surface, a second element defining a supporting surface, the said surfaces being coaxial, and a sleeve of synthetic organic polymeric material having inner and outer surfaces, one of said sleeve surfaces being in sliding engagement with the said bearing surface, the other of said sleeve surfaces being in radial engagement with the said supporting surface adjacent the ends of the sleeve and radially spaced therefrom intermediate the ends of the sleeve, the supporting surface having a circumferential groove therein and the sleeve having a circumferential rib thereon received in the groove and spaced radially from the bottom of the groove.

3. A guide bearing arrangement comprising, in combination, a first element defining a cylindrical bearing surface, a second element defining a supporting surface of circular cross-section, the said surfaces being coaxial, and a sleeve of a synthetic organic polymeric material having inner and outer surfaces, one of said sleeve surfaces being cylindrical and in sliding engagement with the said bearing surface, the other of said sleeve surfaces being in radial engagement with the said supporting surface adjacent the ends of the sleeve, the supporting surface having a circumferential groove therein and the sleeve having a circumferential rib thereon received in the groove and spaced radially from the bottom of the groove.

4. A guide bearing arrangement comprising, in combination, a first element defining a cylindrical bearing surface, a second element defining a supporting surface of circular cross-section, the said surfaces being coaxial, and a sleeve of a synthetic organic polymeric material having inner and outer surfaces, one of said sleeve surfaces being cylindrical and in sliding engagement with the said bearing surface, the other of said sleeve surfaces being in radial engagement with the said supporting surface adjacent the ends of the sleeve and radially spaced therefrom intermediate the ends of the sleeve, the supporting surface having a circumferential groove therein and the sleeve having a circumferential rib thereon received in the groove and spaced radially from the bottom of the groove.

5. A guide bearing arrangement comprising, in combination, an outer element defining a cylindrical bearing surface, an inner element defining a supporting surface of circular cross-section, the said surfaces being coaxial, and a sleeve of nylon having inner and outer surfaces, the outer sleeve surface being cylindrical and in sliding engagement with the said bearing surface, the inner sleeve surface being in radial engagement with the said supporting surface adjacent the ends of the sleeve and radially spaced therefrom intermediate the ends of the sleeve, the supporting surface having a circumferential groove therein and the sleeve having a circumferential rib thereon received in the groove and spaced radially from the bottom of the groove.

References Cited in the file of this patent

UNITED STATES PATENTS

| 1,720,049 | Miller | July 9, 1929 |
| 2,246,086 | Austin | June 17, 1941 |
| 2,378,738 | Smith | June 19, 1945 |